(12) United States Patent
Sloop (10) Patent No.: US 7,959,937 B2
(45) Date of Patent: Jun. 14, 2011

(54) WILD ANIMAL CONTROL APPARATUS AND METHOD

(76) Inventor: John R. Sloop, Dothan, AL (US)

( * ) Notice: Subject to any disclaimer, the term of this patent is extended or adjusted under 35 U.S.C. 154(b) by 1252 days.

(21) Appl. No.: 10/625,146

(22) Filed: Jul. 23, 2003

(65) Prior Publication Data

US 2004/0144018 A1    Jul. 29, 2004

Related U.S. Application Data

(60) Provisional application No. 60/398,293, filed on Jul. 24, 2002.

(51) Int. Cl.
*A01N 25/10* (2006.01)
*A01N 25/32* (2006.01)

(52) U.S. Cl. ......... 424/410; 43/124; 424/78.98; 424/84; 424/405

(58) Field of Classification Search ........................ None
See application file for complete search history.

(56) References Cited

U.S. PATENT DOCUMENTS 2,957,804 A * 10/1960 Shuyler ........................ 424/10.3
5,674,518 A * 10/1997 Fajt ................................ 424/408

OTHER PUBLICATIONS

Getachew, T. "Stomach pH, feeding rhythm and ingestion rate in *Oreochromis niloticus* L. (Pisces:Cichlidae) in Lake Awasa, Ethiopia" Hydrobiologia 174: 43-48, 1989.*

* cited by examiner

*Primary Examiner* — Neil Levy
(74) *Attorney, Agent, or Firm* — Thomas, Kayden, Horstemeyer & Risley, LLP (57) ABSTRACT

The present invention pertains to an apparatus and method for controlling wild animals comprised of an attractant that entices the target wild animal, such as a coyote, to consume the apparatus. Upon consumption, a trigger, which may be covered by a portion of the attractant reacts with fluids in the digestive system of the wild animal, that is, if the fluids are at a predetermined pH level corresponding to the trigger. For if not, the trigger is remains in a state of inactivation, but if the pH is within the predetermined pH range corresponding to the trigger, the trigger is configured to dissolve. Upon dissolving of the trigger, a subduing agent activates causing terminal damage in the digestive system of the wild animal leading to its death. The subduing agent may include metal reactants, chemical agents, percussion devices, compressed sponges, etc.

2 Claims, 8 Drawing Sheets

WILD ANIMAL CONTROL APPARATUS AND METHOD

CROSS-REFERENCE TO RELATED APPLICATION

This application claims priority to copending U.S. provisional application entitled, "System, Method, and Apparatus for Attracting Quarry," having application No. 60/398,293, filed Jul. 24, 2002, which is entirely incorporated herein by reference.

TECHNICAL FIELD

The present invention is generally related to wild animal control and, more particularly, to an apparatus for attracting and exterminating target wild animals.

BACKGROUND OF THE INVENTION

A problem exists in the attempted control of certain non-desired or problem causing wild animals. Many landowners, in attempt to preserve revenue producing crops or livestock, such as cattle, terminate such predatory wild animals, like coyotes, on sight. Nevertheless, livestock and other revenue producing crops cannot always be protected against attack by such nomadic predators.

A similar problem exists on game reserves where landowners and others expend substantial resources to make the reserve habitat ideal for certain animals, such as deer. However, animals such as deer, are preyed upon by nomadic predators such as coyotes, thereby decreasing the number of harvestable deer on the reserves and other hunting land. Thus, a problem exists in preserving such resources from depletion by non-desired wild animals, such as coyotes.

Some states permit the setting of traps designed to poison such predators because of the substantial damage caused to revenue producing crops and other resources. However, the problem that oftentimes arises in the poisoning of such predators is that the poison is communicated to scavenging wildlife that feeds on the poisoned predator after its death. Therefore, instead of merely terminating the predator, the poison can actually cause the death of other wild animals, thereby negatively affecting the balance of wildlife in that environment.

For at least these reasons, there are several problems in attracting and subduing target wild animals, such as coyotes, without affecting other wild animals in the environment. Thus, a heretofore unaddressed need exists in the industry to address the aforementioned deficiencies and inadequacies.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The present invention pertains to an apparatus and method for controlling wild animals comprised of an attractant that entices the target wild animal, such as a coyote, to consume the apparatus. Upon consumption, a trigger, which may be covered by a portion of the attractant, reacts with fluids in the digestive system of the wild animal, that is, if the fluids are at a predetermined pH level corresponding to the trigger. For if not, the trigger remains in a state of inactivation, but if the pH is within the predetermined pH range corresponding to the trigger, the trigger is configured to dissolve. Upon dissolving of the trigger, a subduing agent activates causing terminal damage in the digestive system of the wild animal leading to its death. The subduing agent may include metal reactants, chemical agents, percussion devices, compressed sponges, etc.

Figure 1:
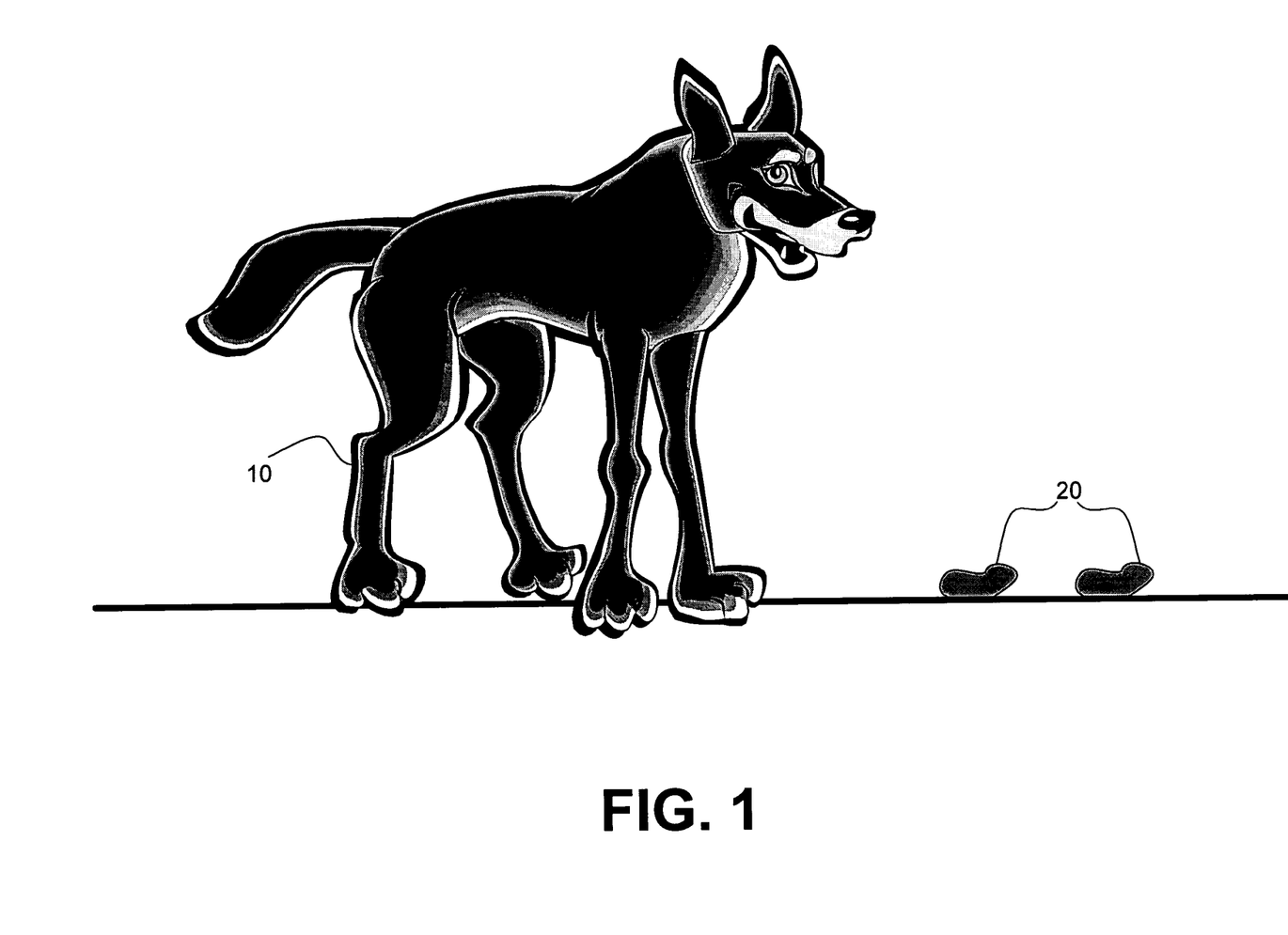
FIG. 1 is a diagram of a target wild animal approaching one embodiment of a subduing device.

FIG. 1 is a diagram depicting a target wild animal 10, which in this nonlimiting example is a coyote, approaching subduing devices 20. Subduing devices 20 may contain an attractant, designed to lure the target wild animal to the desired area. The subduing devices 20 are sized to allow for easy ingestion by the target wild animal; however, subduing devices 20 are generally sized to be too large for human consumption.

Figure 2:
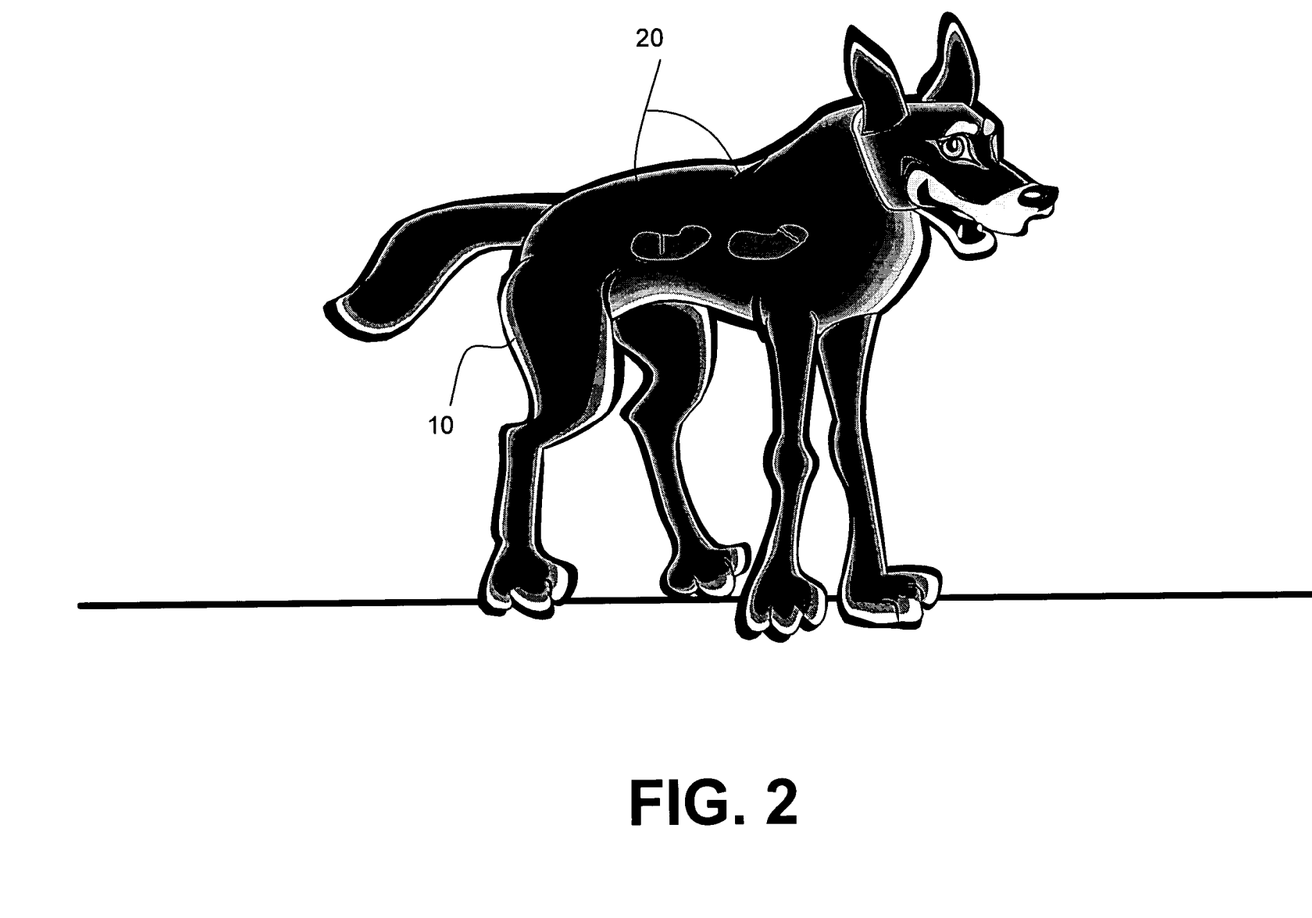
FIG. 2 is a diagram of the target wild animal ingesting the subduing device of FIG. 1.

FIG. 2 is a diagram of target wild animal 10 ingesting subduing devices 20. In one nonlimiting embodiment, the subduing device 20 comprises a trigger device designed to react to a select pH level. For example, if the target wild animal is a coyote, the trigger device will comprise a material that will dissolve at a pH of approximately 0.5-2.5. A coyote's digestive acids generally have a pH of 2.5 or less, so when the coyote ingests the subduing device, the trigger will react when the digestive acids have dissolved the trigger material.

Figure 3:
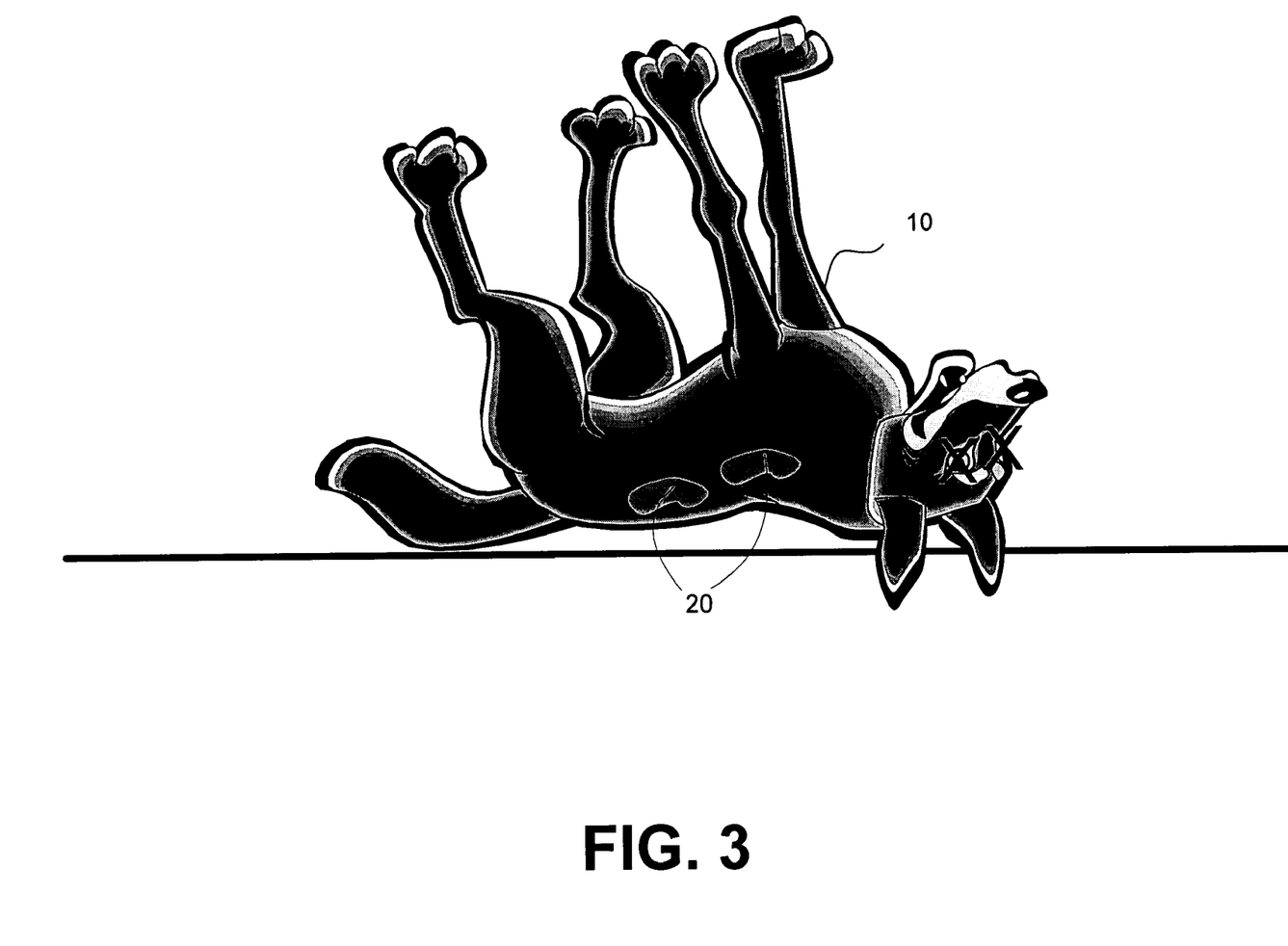
FIG. 3 is a diagram of the target wild animal subdued after ingesting the subduing device of FIG. 1.

FIG. 3 is a diagram showing the desired result of a target wild animal ingesting the subduing device. While some non-limiting embodiments of the subduing device will cause the target wild animal's death, this may or may not be the desired outcome. As evident to one with skill in the art, another embodiment could result in the mere incapacitation of the target wild animal through the use of a tranquilizer or other similar agent.

Figure 4:
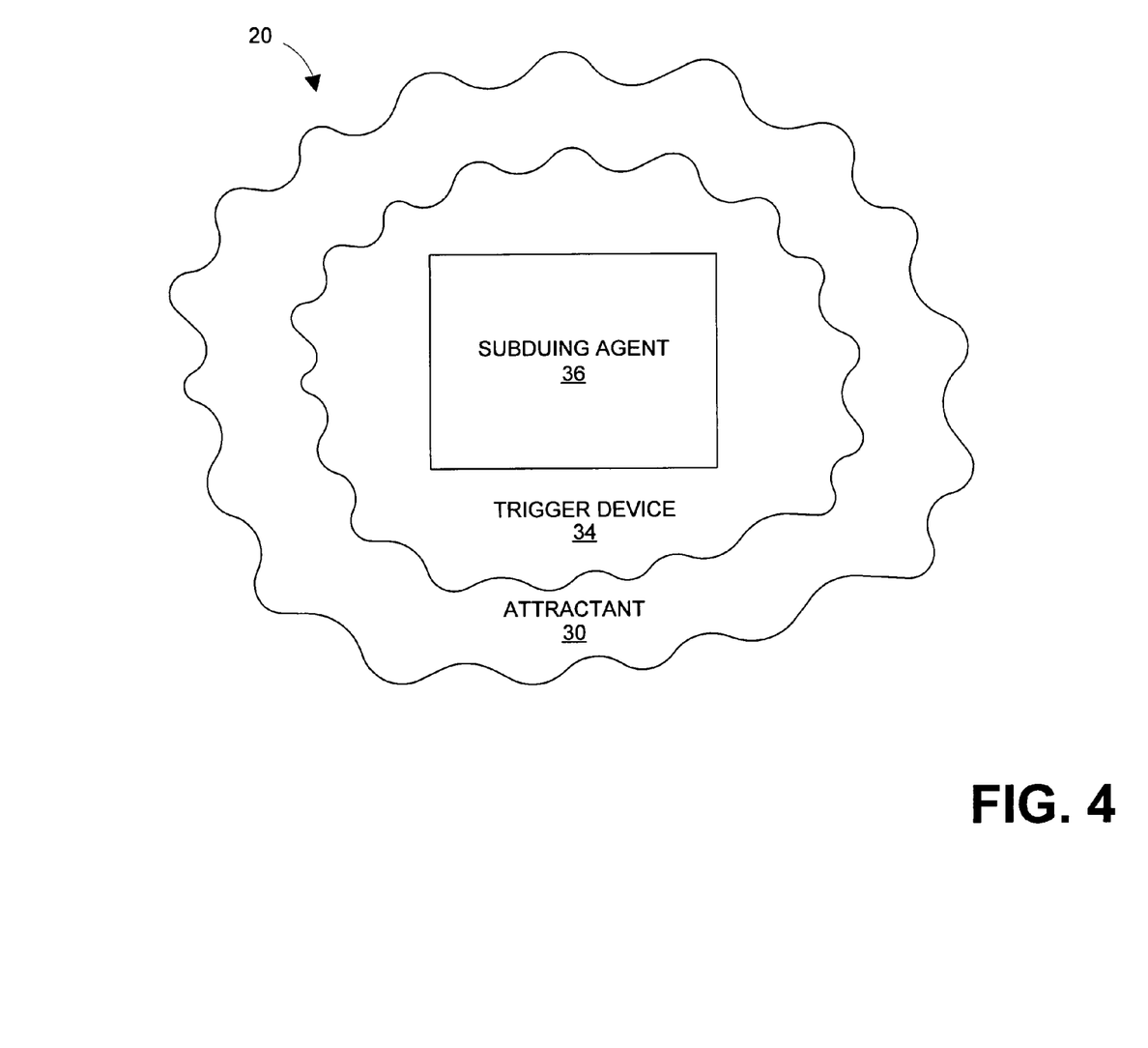
FIG. 4 is a diagram of another embodiment of the subduing device of FIG. 1.

FIG. 4 illustrates one embodiment amount others. The subduing device 20 comprises an attractant layer 30, such as meat or sugar that draws the target wild animal 10 to the subduing device 20. In a nonlimiting example, attractant 30 may be a solid material, and may comprise ingredients with thickening or solidifying agents to enable the attractant 30 to hold a solid form or shape. In another nonlimiting example, the attractant 30 may be configured to model other foods or items that the desired recipient of attractant might otherwise consume in its natural habitat. In this nonlimiting example, attractant 30 could be configured as acorns, sticks, tree stumps, meat and other naturally appearing things. In this manner, the attractant 30, in solid form, may be dispersed in the target wild animal's natural environment and blend with the natural surroundings. By camouflaging attractant 30 in solid form, the target wild animal 10 may be more likely to approach subduing device 20 over a more artificially appearing structure.

In another embodiment, attractant 30 is a meat product for attracting carnivorous wild animals 10, such as coyotes. In such a nonlimiting example, the meat product may comprise any meat that the target wild animal 10 may typically consume.

It should be noted that one of ordinary skill in the art would know that attractant 30 may comprise other ingredients in addition to those listed herein. In addition, one of ordinary skill in the art would know that one or more of the individual ingredients listed herein may be removed completely without destroying the desirability in the attractant 30 to the target wild animal 10. Thus, these particular ingredients are merely indicative of one of many potential embodiments for attractant and should not be construed as limiting attractant 30 to any one set of ingredients. In fact, different ingredients may be substituted to ideally suit the taste of different species of target wild animal 10. Thus, attractant 30 may be modified with different ingredients without varying from the scope of the invention.

In FIG. 4, trigger device 34 is a component designed to react at a predetermined pH level. As stated above, when the target wild animal 10 is a coyote, the predetermined pH level will be approximately 0.5-2.5. Since a coyote's stomach acids generally have a pH level of around 2.5 or less, a trigger device set at a pH of approximately 0.5-2.5 will react appropriately. It should also be noted that since a coyote's stomach acid is of such a high concentration, if another animal, with a stomach acid pH of greater than 2.5 (less acidic), unintentionally consumes the subduing device, the trigger device 34 will not react, and thus will not deliver the subduing agent 36 to that animal.

Configuring the trigger in this manner reduces the risk of delivering the subduing agent to a non-target wild animal. Moreover, placement of subduing device 20 at a proper location within the target wild animal's habitat insures that other animals, such as domestic animals, do not unintentionally discover subduing device 20.

The subduing agent 36 comprises the subduing or incapacitating component of subduing device 20. In one nonlimiting embodiment, the subduing agent 36 may comprise a chemical, drug, metal, percussion device, sponge, or any other material or materials that produce the desired effect of incapacitation or death of the target wild animal 10.

Figure 5:
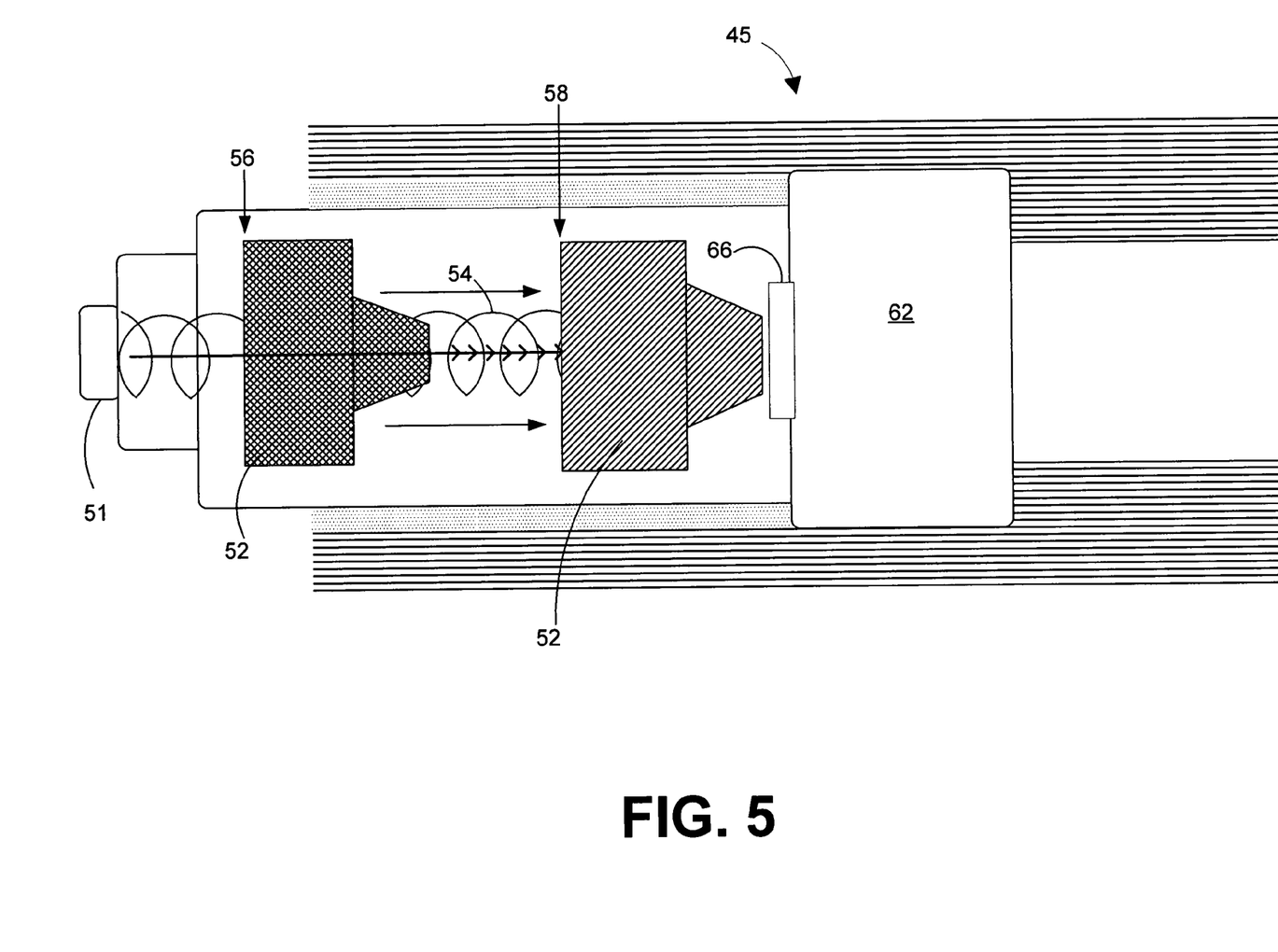
FIG. 5 is a diagram of another embodiment of the subduing device of FIG. 1 having a percussion device with a blasting cap.
Figure 6:
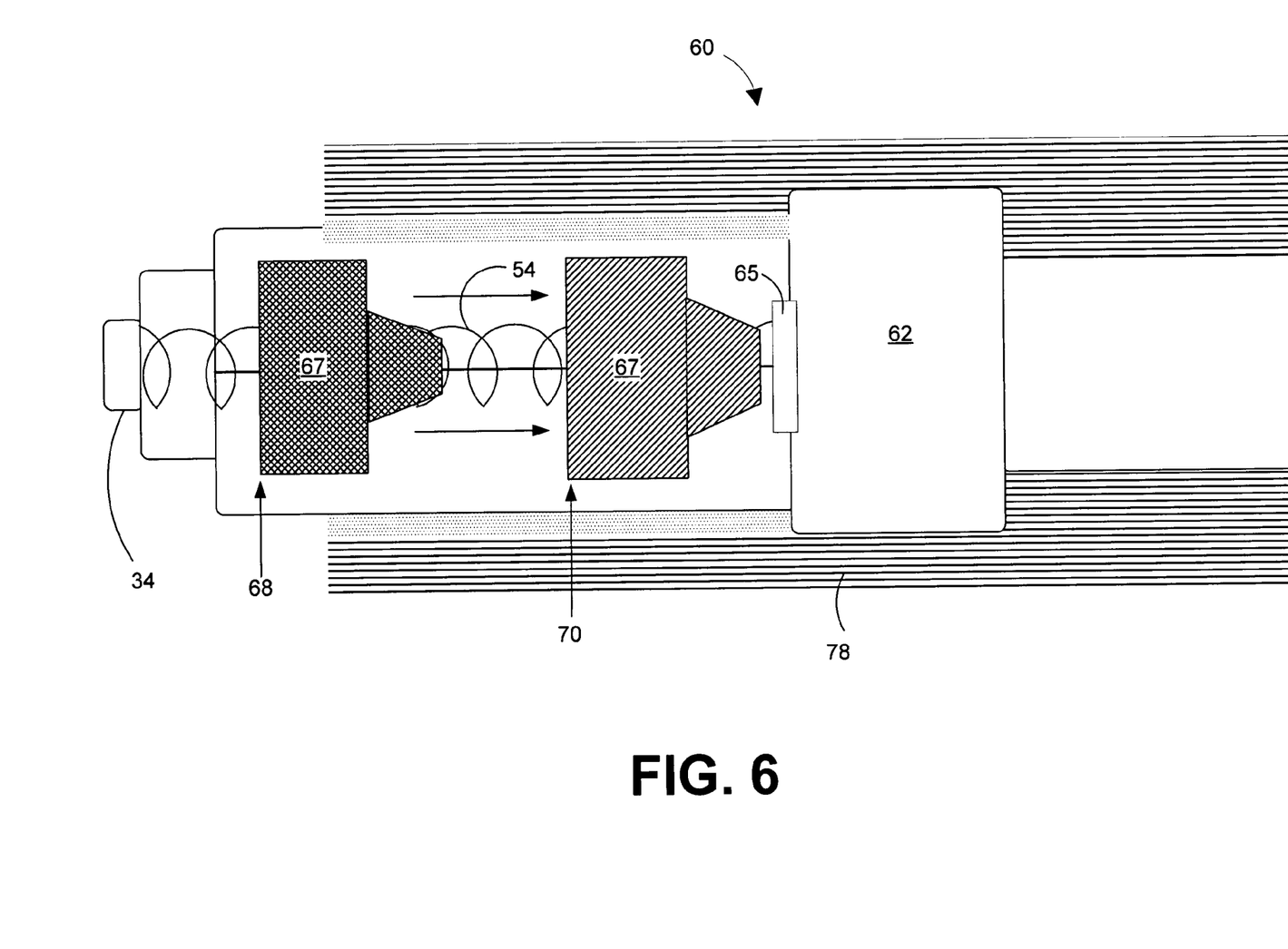
FIG. 6 is a diagram of another embodiment of the subduing device of FIG. 1 having a percussion device.

In one nonlimiting example, the subduing agent 36 may include a percussion device. In this nonlimiting example, upon ingesting the subduing device 20, the percussion device, which is the subduing agent 36 in this instance, subsequently activates causing death to the target wild animal. FIGS. 5 and 6 are diagrams of exemplary percussion devices that may operate as subduing agents 36 and are intended for purposes of illustration without being limiting on this nonlimiting example or on any other aspect contained herein.

In this nonlimiting example, the percussion device 45 may include bullet blank cartridges, blasting caps, chemical explosives and other similar small explosive devices. These exploding devices, in this nonlimiting example are be armed with a trigger device and surrounded by an attractant 30, such as food.

In the nonlimiting example shown in FIG. 5, the trigger device 51 is connected to a rear portion of spring 54. Upon ingesting the percussion device 45 which may be encased within attractant 30, the target wild animal's stomach acid breaks down the attractant 30 and other material so that the trigger device 51 is exposed, which itself is then dissolved by fluids within the stomach. When trigger device 51 dissolves, a firing pin 52 at initial position 56 engages to strike a primer cap 66 at firing pin final position 58, igniting the bullet, blank cartridge, or other small explosive device 62. The effect of the explosion thus causes terminal damage to the target wild animal, such as a coyote, that ingested the percussion device 45 within the subduing device 20.

It should be noted that the percussion device 45 may be configured to activate in desired situations and not in other non-desired situations. As a nonlimiting example, the percussion device 45 may be configured to deliver its percussion or charge when introduced in a selected environment. In this nonlimiting example, a coyote, as target wild animal 10, typically has a stomach pH level of approximately 0.5-2.5. Thus, the percussion device 45 may be configured so that the trigger device 51 activates operates within this range of 0.5-2.5 pH and not in other pH ranges. By coating or covering the trigger with a material that dissolves or dissipates in pH ranges between 0.5-2.5 (or, in this nonlimiting example, any pH below 2.5) and not in any pH above 2.5, the percussion device 45 may be configured to selectively trigger in this unique environment.

If the percussion device 45 is ingested by a coyote, the coyote's stomach fluids, which have a pH level between 0.5-2.5, operate to dissolve or dissipate the trigger device 51. Once the coating material around the trigger device 51 is dissolved, the percussion device 45 thereafter delivers its percussion or charge, as described herein, to subdue the target wild animal 10.

It should be obvious that other triggering pH ranges or even other selective triggering mechanisms may be implemented to cause the percussion device 45 to deliver its percussion or charge to the desired recipient and not to another unintended recipient. In addition, other factors may be implemented to either attract desired recipients as well as repel unintended recipients. As nonlimiting examples, the attractive quality to the desired target wild animal 10 as well as the repulsive quality to other animals may be based at least on the attractant's 30, aroma, size, and/or appearance.

As shown in the another nonlimiting example in FIG. 6, percussion device 60 includes the combination of spring 54 and power source 67. The percussion device 60 operates as similarly described above except that a spring 54 operates to engage a battery 67 in casing 78 from initial position 68 to an electrical connection with connection terminal 65 at battery final position 70. When energized, a bullet, blank cartridge, blasting cap, or other explosive 62 activates and communicates energy to the target wild animal 10, such as a coyote, thereby subduing the target wild animal 10.

Figure 7:
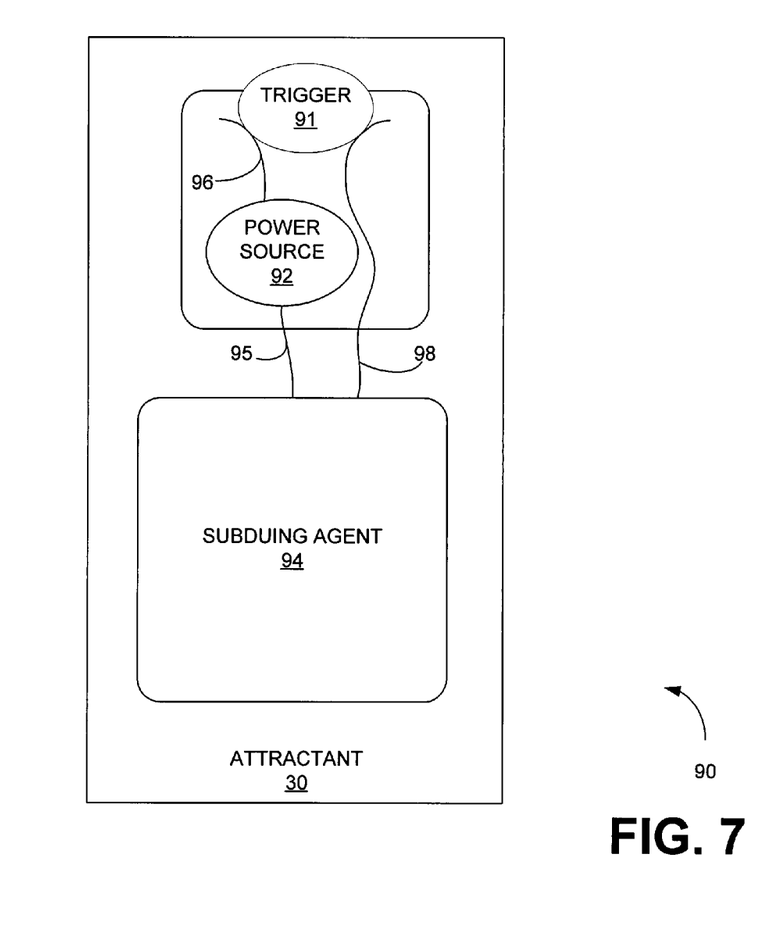
FIG. 7 is a diagram of another embodiment of the subduing device FIG. 1 with a percussion device.

FIG. 7 depicts yet another nonlimiting example of subduing device 90, which may be placed within attractant 30. Subduing device 90 includes a power source 92 and a blasting cap or other explosive charge as part of subduing agent 94. In this nonlimiting example, as shown in FIG. 7, subduing agent 94 is electrically coupled to one terminal of power source 92 by connector 95. The other terminal of power source 92, in this example, is electrically coupled to the trigger device 91 by connector 96. Another connector 98 is coupled between trigger device 91 and subduing agent 94 via connector 98. Thus, the circuit is not completed, thereby preventing the subduing agent 94 from firing, or delivering its charge.

The trigger device 91 in FIG. 7 may be coated so that the coating dissolves in certain environments to enable detonation of subduing agent 94 but does not dissolve in other environments, such as in certain pH environments, as discussed above. The detonation of subduing agent 94 commences after the trigger device 91 dissolves so that connectors 96 and 98 come into electrical communication, thereby enabling power source 92 to electrically communicate with subduing agent 94. Stated another way, upon making electrical communication between connectors 95 and 96, the circuit, which includes power source 92, connector 96, connector 98, subduing agent 94, and connector 95 is completed, thereby communicating an electrical charge to the blasting cap or other explosive device comprising subduing agent 94. In receiving the electrical charge, the subduing agent 94 detonates and subdues the target wild animal 10.

Figure 8:
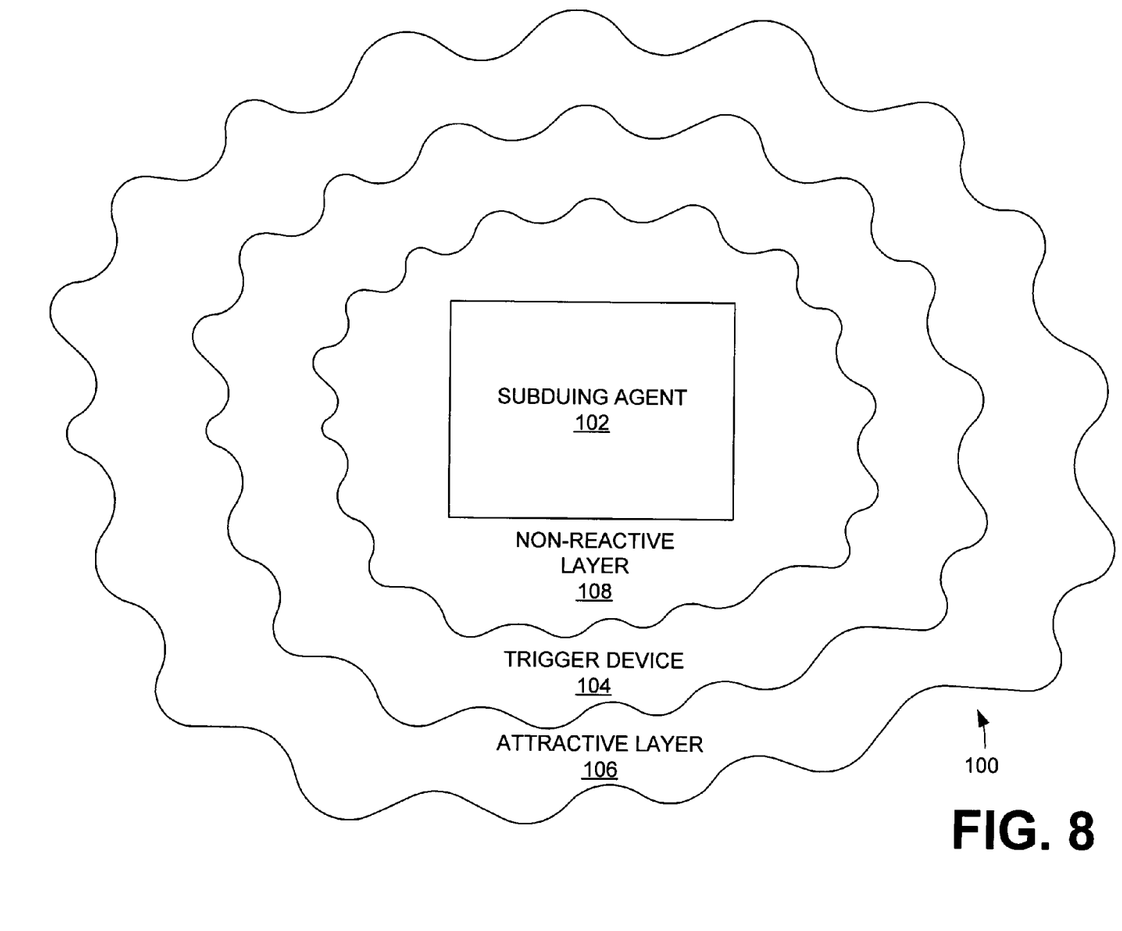
FIG. 8 is a diagram of another embodiment of the subduing device of FIG. 1 with a chemical or metal as the subduing agent.

FIG. 8 depicts another embodiment among others of the subduing device 100, where the subduing agent 102 may comprise a metal, chemical, a plurality of metals, a plurality of chemicals, or any combination thereof. In this nonlimiting embodiment, the subduing agent 102 reacts violently with the target wild animal's body, causing death or incapacitation. When the trigger device 104 reacts and dissolves, and after nonreactive layer 108 dissolves, the subduing agent 102 releases reacts in the target wild animal's stomach. The reaction between the subduing agent 102 and the body of the target wild animal 10 results in the death or incapacitation of the target wild animal 10 due to the energy release of the subduing agent 102, which may be a metal. The energy release from the subduing agent 102 within the target wild animal's digestive system causes terminal damage resulting in rapid extermination of the target wild animal.

One of ordinary skill would know that varied quantities of the subduing agent 102 may be used to achieve the desired effect for the desired target wild animal. As a non-limiting example, a larger or smaller quantity of subduing agent 102 (i.e., sodium, potassium, or lithium) may be used to subdue an alligator as opposed to a coyote or a wild hog.

As nonlimiting examples of the subduing agent 102, sodium, potassium, lithium, metal, or any combination thereof, or of any other similar type metal reactants may be used, as known by one of ordinary skill in the art. The subduing agent 102, in this embodiment, is also covered by a nonreactive layer 108, which may be mineral oil or other material that dissolves during the target wild animal's 10 digestive process. The nonreactive layer 108 operates to prevent the subduing agent from reacting until the trigger device 104, as similarly described above, first dissolves in the appropriate pH environment. Because many subduing agents 102, such as sodium, potassium, and lithium, are known to react with airborne agents, the nonreactive layer 108 retards that process.

Trigger device 104 initially dissolves in the target wild animal's 10 digestive system, that is, if the stomach fluids are at the appropriate trigger pH level. Thereafter, the target wild animal's 10 stomach fluids dissolve the nonreactive layer 108, which may be, but is not generally reactive based on any particular pH value.

In a nonlimiting embodiment, the subduing agent 102 may comprise some digestible material only consumable by the intended target wild animal recipient. As one nonlimiting example, in areas that permit control of coyotes, subduing device 20 (FIG. 1) may take the form of an edible sponge (not shown) carrying the attractant 30. The size of the sponge is configured to only be ingestible by the target wild animal 10 rather than nontarget animals. Upon ingesting the subduing device 20 carrying the sponge, the trigger device dissolves, leading to the death or incapacitation of the target wild animal.

In one nonlimiting example, the sponge itself, due to its size, may lead to the coyote's death after ingestion by expanding to create a blockage within the target wild animal's digestive system. Thus, the trigger, in this nonlimiting example, may be a material that restricts the size of the sponge so that it can be ingested by the target wild animal. After ingestion, the trigger material dissolves allowing the sponge to expand. Once expanded, the sponge cannot be passed through the target wild animal's digestive system and actually creates a blockage that causes the death of the target wild animal. While not as quick acting in subduing the target wild animal, the effect is similar to those described above and likewise does not communicate any negative effects to scavengers that feed on the terminated target wild animal, unlike poisoning, as described above.

As another nonlimiting example, a natural or artificial aroma, flavor or food may be implemented as the attractant 30 in the edible sponge. The sponge may be a household sponge, dehydrated sponge, or compressed sponge or any other material that will be indigestible by the intended target wild animal, which in at least one nonlimiting example is a coyote. The attractant 30 in this nonlimiting example is chosen to appeal to the desired target wild animal's sense of smell so that the target wild animal (such as a coyote) ingests the sponge upon discovery of the sponge.

In yet another nonlimiting example (not shown), the sponge may contain a razor or any other sharp cutting device. In this nonlimiting example, a wrapping material, as described above, may be attached to sponge so that the sponge will expand when the wrapping material dissolves or disengages from the sponge. While wrapped in the wrapping material, the sponge is prevented from expanding. The sponge may also, as similarly described above, carry absorbed attractants designed to attract the target wild animal 10, such as, in this nonlimiting example, a coyote.

Once ingested by the target wild animal (such as, in one nonlimiting example, a coyote), the wrapping material is dissolved so that the sponge may expand and release the razor or other sharp cutting device. The razor or sharp cutting device thereafter causes terminal damage to the recipient target wild animal (such as, in this nonlimiting example, a coyote).

Just as above, the sponge is configured to be non-consumable by humans based on appearance, aroma, or the attractant 30 itself. Moreover, the sponge, in this and all nonlimiting examples, is configured so that the subduing agent is not delivered unless consumed by the target wild animal, such as a coyote. Moreover, it should be understood that application of each of these alternative embodiments is only intended for those areas where such control is permitted.

Other systems, methods, features, and advantages of the present invention will be or become apparent to one with skill in the art upon examination of the aforementioned ingredients. It is intended that all such additional systems, methods, features, and advantages be included within this description, and be within the scope of the present invention.

It should be emphasized that the above-described embodiments are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure.

Therefore, having thus described the invention at least the following is claimed:

1. A wild animal control apparatus, comprising:
   meat, utilized to attract a wild animal;

an energy release device, surrounded by the meat, the energy release device utilized such that when the wild animal consumes the meat, the wild animal also consumes the energy release device; and a trigger device that contains the energy release device, the trigger device utilized such that when the wild animal consumes the meat and energy release device, stomach acids of the wild animal that are in the range of 0.5-2.5 pH chemically react with the trigger device to dissolve the trigger device, wherein upon dissolving the trigger device, the energy release device releases energy within the wild animal to subdue the wild animal.

2. The wild animal control apparatus of claim 1, wherein the energy release device subdues the wild animal without poisoning the wild animal.

* * * * *